May 16, 1961 D. N. JUDELSON 2,984,496
CHUCK WITH GRIPPING AND PENETRATING ELEMENTS
Filed Aug. 8, 1958

INVENTOR.
DAVID N. JUDELSON
BY Ameter + Levy
ATTORNEYS

United States Patent Office 2,984,496
Patented May 16, 1961

2,984,496

CHUCK WITH GRIPPING AND PENETRATING ELEMENTS

David N. Judelson, New York, N.Y., assignor to Oscar I. Judelshon, Inc., New York, N.Y., a corporation of New York Filed Aug. 8, 1958, Ser. No. 754,019

9 Claims. (Cl. 279—110)

The present invention relates generally to machines for cutting materials such as cloth, paper and the like, and in particular to an improved chuck for rotating a roll of material in such cutting machines. This is a continuation-in-part of my earlier filed application Serial No. 694,169, filed November 4, 1957, now Patent No. 2,938,733.

It is generally known to provide a rotary knife cutting machine of the type in which a roll of material is rotated on a longitudinal supporting shaft or spindle on the machine frame, which roll is parted or cut into strips of a prescribed width by the action of a high speed rotary knife. These machines fall into two general categories, those in which the roll of material is moved longitudinally relative to the knife between successive cutting cycles, and those in which the knife is moved longitudinally relative to the roll of material during successive cutting cycles. In my United States Patent No. 2,457,310 of December 28, 1948, there is illustrated a machine of the latter type in which the roll of material is rotated about a longitudinal supporting shaft fixed to the frame by means of a chuck which is rotatably mounted on the supporting shaft and driven from an appropriate variable speed drive. The rotary knife of the machine is brought into cutting relation with the roll of material manually; and indexing mechanisms are provided whereby the entire knife head assembly may be moved step-wise along the length of the rotating roll to make successive cuts of predetermined width.

In using this type of machine, the operator takes the roll of material, which is supported on a core or sleeve of cardboard, or like easily cut material, and first trims up one end face of the roll. Thereupon, the roll of material is placed on the supporting shaft or spindle, with the trimmed end face abutting against the clamping plate of the chuck which is intended to rotate the roll of material during the cutting operation. The chuck is connected to the roll of material by a series of clamping jaws or dogs which are mounted on the chuck for radial movement inwardly and outwardly. These clamping jaws or dogs include pointed elements which penetrate the outer periphery of the roll of material so as to rotate the roll and its core about the supporting shaft or spindle. Once the machine is set up, the operator, after appropriately adjusting the indexing mechanisms, manually moves the high speed rotary knife of the knife head assembly into contact with the turning roll until the knife cuts entirely through the roll and the supporting core to part a strip from the end of the roll remote from the previously trimmed end which abuts the chuck plate and is connected to and driven by the chuck. When the rotary knife is retracted to a clearance position relative to the roll, the entire knife head assembly is indexed toward the chucked end of the roll through a prescribed longitudinal traverse corresponding to the desired thickness of the cut strip and the knife head is again brought into progressive contact with the roll of material to cut the next strip therefrom. This operation is repeated until the entire roll is cut into strips. As the rotary knife approaches the chucked end of the roll, there is a pronounced tendency of the knife to pull the roll of material axially and in a direction away from the driving chuck. This pulling force, which becomes more pronounced as the chucked end of the roll is approached, manifests itself by causing the end face of the roll being cut to assume a somewhat conical taper, with the apex of the conically tapered end face contiguous to the core and longitudinally displaced along the core axis away from the chuck plate. The trimmed and chucked end of the roll is formed with a conical depression, with the apex of the cone substantially at the core. This may be attributed to the fact that the core and the contiguous inner plies of material have less resistance to the axial pulling force exerted by the knife and thereby are more easily displaced away from the chuck plate. In actual practice, this tendency makes it necessary for the operator to hold in on the end face of the roll remote from the chuck in an attempt to counteract the tendency of the inner portion of the roll to travel away from the chuck under the influence of the cutting knife. It is not uncommon to see an operator pushing with his hand against the core and the adjacent inner portion of the roll of material in the direction of the chuck to avoid coning of the roll of material. Further, it is often necessary for the operator, before taking the last few cuts from a roll to release the chuck, turn the roll end for end, trim up the previously trimmed face which is formed with the inwardly directed conical depression, again turn the roll end for end, reclamp the retrimmed roll of material, and thereafter take the last few cuts still bearing against the cut end face remote from the chuck to minimize the tendency of the roll to walk away from the chuck under the influence of the cutting knife. Obviously, the described procedure is time consuming, wasteful of material, and often results in cuts which are not uniform. Quite separate and apart from this, the necessity of having the worker achieve these additional manual operations in cutting up a roll of material virtually precludes the construction of a completely automatic rotary knife type of cutting machine since the retrimming operation is basically antagonistic to the attainment of an automatic system.

It is broadly an object of the present invention to provide improved means for rotating a roll of material in a rotary knife cutting machine which obviates one or more of the aforesaid difficulties. Specifically, it is within the contemplation of the present invention to provide an improved chuck for use with a roll of material wound on a core which is effective to turn the roll of material in a manner calculated to preclude axial displacement of the roll incident to the reaction of the knife during operation of the cutting machine.

In accordance with an illustrative embodiment demonstrating features of my invention, an improved chuck for use with a roll of material carried on a core and adapted to be supported on a shaft comprises a chuck body with bearing means operatively connected to said chuck body and adapted to be engaged with said shaft for journaling said chuck body on said shaft. First roll gripping and penetrating means are carried by said chuck body and are adapted to engage said roll of material contiguous to said core for connecting said roll and core to said chuck body. The first roll gripping and penetrating means includes a material-penetrating element and means mounting said element for penetrating movement having a component axially of said shaft and a component radially of said shaft. Further, second roll gripping and penetrating means are carried by said chuck body and are adapted to engage said roll of material contiguous to its outer periphery for connecting said roll to said chuck body whereby drive is imparted to both said core and said roll of material in response to rotation of said chuck body. Advantageously, with my improved chuck, it is possible to cut a roll of material into a series of tapes or strips of a prescribed width, from end to end, without the necessity of retrimming the roll and/or manually attempting to counteract the axial displacing forces incident to the cutting operation.

My improved mechanisms enable the clamping or chucking of a roll of material contiguous to its core and at its outer periphery without adversely affecting the roll of material or its supporting core (i.e. appreciably damaging the roll or splitting the core). Further, the requisite chucking force can be developed in a manner compatible with good machine practices in that it is not necessary to structurally undermine any portion of the machine to develop the requisite chucking force. Further, the chuck is exceptionally versatile in that it can accommodate rolls of varying diameters, whether supported on a tube terminating flush with the end face of the roll to be clamped or projecting beyond said end face.

The above brief description, as well as further objects, features and advantages of the present invention, will be more fully appreciated by reference to the following detailed description of several presently preferred embodiments of the invention, when taken in conjunction with the accompanying drawing, wherein.

Figure 1:
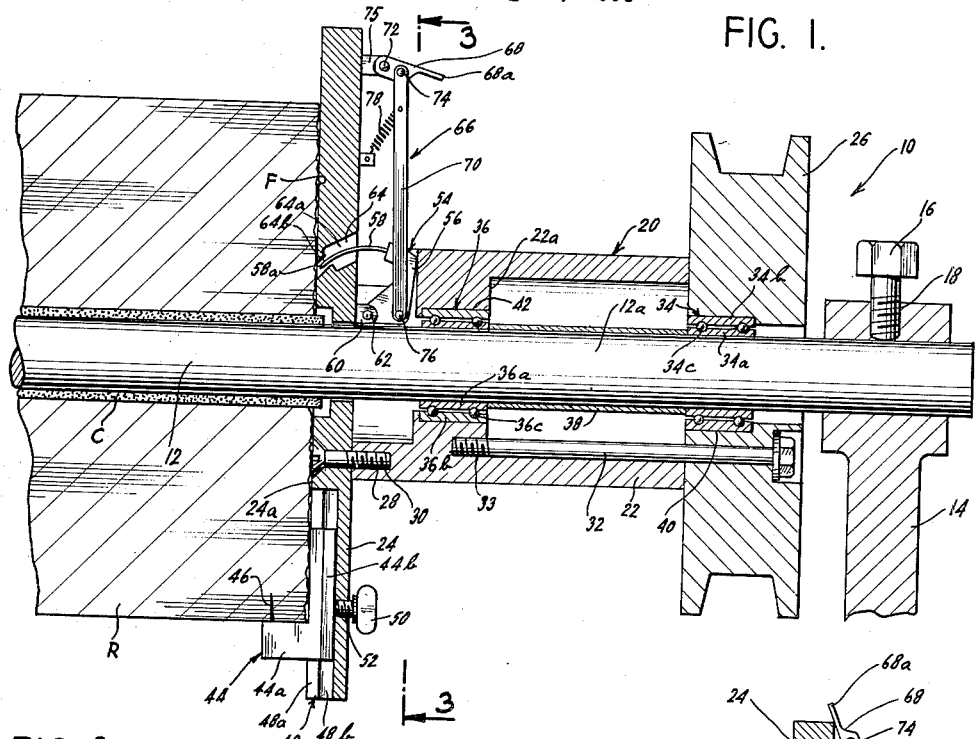
Fig. 1 is a longitudinal section, with parts broken away and sectioned, showing my improved chuck on a typical rotary knife cutting machine with the inner roll-penetrating elements shown preliminary to engagement with the roll of material.

Referring now specifically to the drawings, there is shown in Fig. 1 my improved chuck, generally designated by the reference numeral 10, which is to be employed in connection with a roll of material R wound on a core C which is received on the shaft 12 of the rotary knife cutting machine. In the interests of simplicity and clarity, the details of the rotary knife cutting machine, except for the stationary supporting shaft or spindle 12 and the adjacent supporting stanchions 14 have been eliminated. The supporting shaft 12 is fixed to the adjacent stanchion 14 by a lock bolt 16 received within a tapped hole 18 in the stanchion. For a detailed showing of a typical environment in which the improved chuck 10 is to be employed, reference may be made to my mentioned Patent No. 2,457,310 or to my copending application Serial No. 722,301 filed March 18, 1958, and entitled Improved Cutting Machine. However, it is to be expressly understood that the machine of my issued patent and of my copending application are intended to be merely illustrative of the applications for the chuck 10; and the chuck will have further application in different types of rotary knife cutting machines, as will be apparent to those skilled in this art.

The chuck 10 includes a chuck body 20 which is rotatably journaled on the end section 12a of the supporting shaft or spindle 12, as will be subsequently described. The chuck body 20 incorporates a hollow cylindrical housing 22 which carries at one of its sides a chuck plate 24 and at the other of its sides a driven pulley element 26. The chuck plate 24 is secured to the housing 22 by machine screws 28 which are countersunk into the outer face 24a of the chuck plate and received within appropriate threaded bores 30 in the adjacent end face of the housing 22. The driven pulley element 26 is secured to the housing 22 by a series of machine bolts 32 which extend through the driven pulley element 28 and into appropriate threaded bolt receiving apertures 33 in the housing 22.

The chuck body 20 is mounted on the end section 12a of the supporting shaft 12 for rotation by a pair of bearings 34, 36 separated by a spacer sleeve 38. Each of the bearings 34, 36 includes an inner race 34a, 36a, an outer race 34b, 36b and interposed ball bearings 34c, 36c. The bearing 34 is received within a circular seat 40 formed in the adjacent inner face of the driven pulley member 26. By an appropriate force fitting, the outer race 34b of the bearing 34 is attached to the driven pulley element 26 and for all intents and purposes may be considered to be integral therewith. The inner race 34a of the bearing 34 bears against the adjacent end face of the sleeve 38. The bearing 36 is received within a circular seat 42 formed in the housing 22 with the outer race 36b secured to the housing. The circular seat 42 is of a depth such that the inner face of the bearing 36 is flush with the inner face 22a of the housing 22, with the bearing 36 abutting the other end face of the sleeve 38. By this arrangement, the chuck body 20 and the chuck components supported thereby are rotatable about the shaft section 12a, with the sleeve 38 and the inner bearing races 34a, 36a stationary.

The chuck plate 24 carries a series of circumferentially spaced clamping members or chuck jaws, designated generally by the reference numeral 44 which are adapted to penetrate and grip the roll R at its outer periphery. The chuck or clamping jaws 44 each embody a jaw body 44a of substantially T-shaped configuration (see Fig. 1) which carry roll-penetrating pins 46. The T-shaped chuck jaws 44 are mounted on the chuck plate 24 for radial movement inwardly and outwardly relative to the supporting shaft 12 through the provision of radially-extending T-shaped guideways, 48. The guideway 48 includes a narrow throat section 48a of a width substantially equal to the leg section 44a of the chuck jaw 44 and a somewhat wider rear section 48b dimensioned to receive the cross head section 44b of the chuck jaw 44. Although not illustrated, the guideways for the remaining chuck jaws are identical in construction to the guideway 48 for the chuck jaw 44.

In order to lock the respective chuck jaws 44 in various positions of radial adjustment, with the pin 46 thereon in engagement with the outer periphery of the roll R, a set screw 50 is mounted on the chuck plate 24 behind the respective chuck jaws 44. Each of the set screws 50 is mounted in an appropriate tapped hole 52 which communicates with the adjacent guideway 48 such that the leading end of the set screw 50 may be brought to bear against the adjacent rear face of the cross head section 44b of the chuck jaw 44. When the set screw 50 is loosened, adjustment can be made to radially position the respective chuck jaws; and thereafter the set screw may be tightened down to fix the chuck jaws in their adjusted positions.

Figure 3:
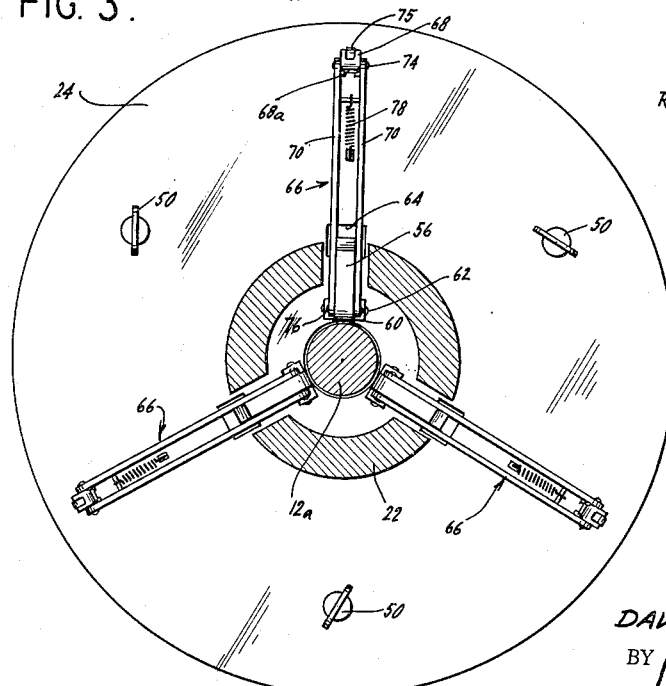
Fig. 3 is a transverse section through the chuck, taken substantially along the line 3—3 of Fig. 2 and looking in the direction of the arrows.
Figure 2:
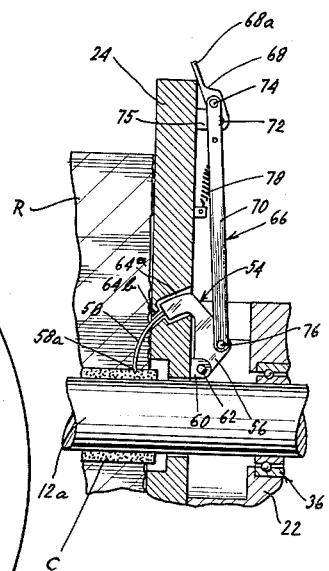
Fig. 2 is a fragmentary longitudinal section through the chuck and the adjacent portions of the roll and core showing the roll-penetrating elements after engagement into said roll.

Internally of the chuck body 20 there is provided a further or inner series of chuck jaws or clamping members, one such member being generally designated by the reference numeral 54 (see Figs. 1 and 2). As seen in Fig. 3, three such chuck jaws are provided, with the respective jaws being spaced approximately 120° from each other. It is noted that the outer chuck jaws 44 are arranged in a set of three, with the jaws 44 circumferentially spaced 60° from the jaws 54. Each of the chuck jaws 54 includes a rocker arm 56 mounted for pivotal movement about an axis transverse to the shaft 12 which carries a curved roll-penetrating element 58. The rocker arm 56 is pivotally mounted on the rear face of the chuck plate 54 by means of a bracket 60 which is substantially U-shaped and is fixed to the chuck plate 24, with a pin 62 extending through the rocker arm and the adjacent legs of the bracket 60. Accordingly, the rocker arm 56 of the inner chuck member 54 may be swung through a prescribed arcuate thrust to urge the roll-penetrating element 58 through an arcuate path which is directed inwardly toward the core C of the roll R, with the roll-penetrating element 58 having an axial and inward component of motion relative to the roll R such that the adjacent end face F of the roll is penetrated with a radial and inward component of motion such that the roll-penetrating element moves toward the core C.

In order to provide the necessary clearances for the roll-penetrating element 58 and the rocker arm 56, the chuck plate 24 is formed with a cut-out 64 for each chuck jaw 54 which has an enlarged mouth portion 64a of a width and height sufficient to accommodate the forward portion of the rocker arm 56 and a somewhat constricted base portion 64b which is dimensioned to permit passage therethrough of the roll-penerating element 58. As seen in Figs. 1 and 2, the cut-out or passageway 64 is disposed at an angle corresponding approximately to the arcuate thrust path of the associated chuck jaw 54 to allow the same to be moved through its prescribed arcuate thrust without obstruction.

Operatively connected to each of the inner chuck jaws 54 is an actuating means, generally designated by the reference numeral 66 which is effective to drive the associated chuck jaw or member 54 through the required arcuate thrust for driving the roll-penetrating element 58 into the adjacent end face F of the roll R. As seen in Fig. 1, the chuck jaw 54 is normally disposed in a retracted position wherein the roll-penetrating element 58 is disposed outwardly of the plane of the inner face 24a of the chuck body 24 which contacts the end face F of the foll R. Upon pivoting the rocker arm 56 in the counterclockwise direction about the pivot pin 62, as may be appreciated by progressively inspecting Figs. 1 and 2, the roll-penetrating element 58 is driven through the necessary arcuate thrust until the leading end 58a thereof has penetrated the roll R sufficiently to achieve the necessary gripping action, preferably to a point where the leading end penetrates the core C. It will be appreciated that the roll-penetrating element must be constructed of a materail capable of piercing the roll R and in some instances the actuating means 66 must be operated with a mechanical advantage to enable the penetration to be achieved, particularly when working with rolls of material which are wound relatively tight. In this embodiment of the invention, the actuating means 66 is in the form of a toggle linkage which includes an actuating lever or link 68 and side by side connecting levers or links 70. The actuating lever 68 has a pivotal connection at one end to a bracket 75 fixed to the chuck plate 24 and is formed at its other end with a handle 68a. Intermediate its ends the actuating lever 68 is connected to one pair of ends of the connecting links 70 at a knee pivot 74, with the other pair of ends of the connecting links 70 having a pivotal connection 76 to the rocker arm 56 at a point spaced from its pivotal mount 62. A spring 78 is connected between the chuck plate 24 and the connecting links 70 to provide the necessary biasing force on the toggle linkage 66. Normally the pivots 72, 74, 76 of the linkage are in an out-of-line position with the link portion between the pivots 72 and 74 and the link portion between the pivots 74 and 76 forming an acute angle with respect to each other. In response to counterclockwise rotation of the actuating lever 68 about the pivot 72, the knee pivot 74 is swung to a dead center position past the in-line of the pivots 72, 76, as may be seen by inspecting Fig. 2, which brings the actuating linkage into the locked position wherein the actuating lever 68 bears against the adjacent portion of the chuck plate 24. In response to operation of the actuating means 66, the associated chuck member 54 is engaged in the roll R, as illustrated in Fig. 2.

A typical sequence of operations will be described to facilitate a more thorough understanding of the present invention:

The worker takes the roll R of material and places the same on the supporting shaft 12, and the roll R is advanced toward the chuck plate 24. When the roll R is brought into abutment with the clamping plate, the clamping jaws 44 are moved radially inward such that the roll-penetrating elements 44 enter the outer periphery of the roll R, as seen best in Fig. 1. The internal clamping jaws 54 are then radially displaced toward each other to grip the plies of material and the core C. This completes the operations required to ready the machine for cutting the roll R into a series of cuts of a prescribed width.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What I claim is:

1. An improved chuck for use with a roll of material carried on a core and adapted to be supported on a shaft comprising a chuck body, bearing means operatively connected to said chuck body and adapted to be engaged with said shaft for journalling said chuck body on said shaft, first roll gripping and penetrating means carried by said chuck body outwardly of said bearing means and adapted to engage said roll of material contiguous to said core for connecting said roll and core to said chuck body, said first roll gripping and penetrating means including a material-penetrating element and means mounting said element for penetrating movement having a component axially of said shaft and a component radially and inwardly of said shaft, and second roll gripping and penetrating means carried by said chuck body and adapted to engage said roll of material contiguous to its outer periphery for connecting said roll to said chuck body whereby drive is imparted to both said core and said roll of material in response to rotation of said chuck body.

2. An improved chuck for use with a roll of material carried on a core and adapted to be supported on a shaft comprising a chuck body, bearing means operatively connected to said chuck body and adapted to be engaged with said shaft for journalling said chuck body on said shaft for rotation about said shaft, drive means operatively connected to said chuck body for rotating said chuck body, first roll gripping and penetrating means carried by said chuck body outwardly of said bearing means and adapted to engage said roll of material contiguous to said core for connecting said core and roll to said chuck body, said first roll roll gripping and penetrating means including at least one material-penetrating element, and means mounting said material penetrating element on said chuck body for penetrating movement into said roll, said penetrating movement having a first component axially of said roll and a second component radially and inwardly of said roll and toward said core, and second roll gripping and penetrating means carried by said chuck body and adapted to engage said roll of material contiguous to its outer periphery for connecting said roll to said chuck body whereby drive is imparted to both said core and said roll of material in response to rotation of said chuck body.

3. In combination, a shaft adapted to receive a roll of material carried on a core, and a chuck for rotating said roll of material comprising a chuck body, bearing means operatively connected to said chuck body and supported on said shaft for journalling said chuck body on said shaft for rotation, drive means operatively connected to said chuck body for rotating said chuck body, and roll gripping and penetrating means carried by said chuck body and adapted to engage said roll of material contiguous to said core for connecting the inner portion of said roll of material to said chuck body, said roll gripping and penetrating means including at least one roll-penetrating element, means mounting said roll-penetrating element on said chuck body outwardly of said bearing means for pivotal movement through an arcuate thrust including motion components axially of and radially inwardly of said shaft, and actuating means operatively connected to said roll-penetrating element for moving the same through said arcuate thrust.

4. An improved chuck for rotating a roll of material wound on a core and adapted to be supported on a shaft, comprising a chuck body including a chuck plate adapted to bear against an end face of said roll, means operatively connected to and journalling said chuck body for rotation relative to said shaft, and gripping means on said chuck body adapted to engage said roll adjacent to the core and outer periphery thereof for attaching said roll to said chuck body for rotation therewith, said gripping means including material-penetrating elements, means mounting said material-penetrating elements for extensible movement through said chuck plate at a location contiguous to but spaced outwardly of said core to penetrate into the adjacent end face of said roll into gripping engagement with said roll, further material-penetrating elements contiguous to said outer periphery of said roll and arranged to penetrate the outer periphery of said roll, and means on said chuck body mounting said further material-penetrating elements on said chuck body for movement into gripping engagement with said roll.

5. A chuck for use in a rotary knife cutting machine of the type including a shaft adapted to receive a roll of material carried on a core, said chuck being adapted to rotate said roll of material and comprising a chuck body including a chuck plate having an outer face adapted to contact said roll of material, said chuck plate having an opening extending therethrough, bearing means operatively connected to said chuck body and adapted to be supported on said shaft for journalling said chuck body on said shaft, roll-penetrating means carried by said chuck body inwardly of said chuck plate and including roll-penetrating elements extending substantially lengthwise of said chuck body and adapted to be extended through said opening and to penetrate an end face of said roll of material contiguous to said core for connecting the inner portion of said roll of material to said chuck body, means mounting said roll-penetrating elements on said chuck body for gripping movement through an arcuate thrust from a retracted position relative to said chuck plate to an extended position relative to said chuck plate wherein said roll-penetrating elements engage said roll with said arcuate thrust including a motion component axially and inwardly of said roll of material and a motion component radially and inwardly of said roll of material, and actuating means operatively connected to said roll-penetrating elements for effecting said gripping movement.

6. In an improved chuck for use with a roll of material carried on a core and adapted to be supported on a shaft, a chuck body, bearing means operatively connected to said chuck body and adapted to be engaged with said shaft for journaling said chuck body on said shaft for rotation about said shaft, drive means operatively connected to said chuck body for rotating said chuck body, and roll gripping and penetrating means carried by said chuck body and adapted to engage said roll of material contiguous to said core for connecting said core and roll to said chuck body, said roll gripping and penetrating means including at least one material-penetrating element disposed outwardly of said bearing means, and means mounting said material penetrating element on said chuck body for penetrating movement having a first component axially of said roll and a second component radially and inwardly of said roll and toward said core.

7. In combination, a shaft adapted to receive a roll of material carried on a core, and a chuck for rotating said roll of material comprising a chuck body, bearing means operatively connected to said chuck body and supported on said shaft for journaling said chuck body on said shaft for rotation, drive means operatively connected to said chuck body for rotating said chuck body, and roll gripping and penetrating means carried by said chuck body and adapted to engage said roll of material contiguous to said core for connecting the inner portion of said roll of material to said chuck body, said roll gripping and penetrating means including at least one roll-penetrating element disposed outwardly of said shaft, and means mounting said roll-penetrating element on said chuck body for pivotal movement through an arcuate thrust including motion components axially of and radially inwardly of said shaft.

8. A chuck for use in a rotary knife cutting machine of the type including a shaft adapted to receive a roll of material carried on a core, said chuck being adapted to rotate said roll of material and comprising a chuck body including a chuck plate having an outer face adapted to contact said roll of material, said chuck plate having circumferentially spaced openings extending therethrough, bearing means operatively connected to said chuck body and adapted to be supported on said shaft for journaling said chuck body on said shaft, roll-penetrating means carried by said chuck body inwardly of said chuck plate and including roll-penetrating elements extending substantially lengthwise of said chuck body and adapted to be extended through said openings and to penetrate the adjacent end face of said roll of material contiguous to said core for connecting the inner portion of said roll of material to said chuck body, means mounting said roll-penetrating elements on said chuck body for gripping movement through a prescribed arcuate and inward thrust from a retracted position relative to said chuck plate to an extended position relative to said chuck plate wherein said roll-penetrating elements engage said roll, and actuating means operatively connected to said roll-penetrating elements for effecting said gripping movement.

9. An improved chuck for rotating a roll of material wound on a core and adapted to be supported on a shaft, comprising a chuck body including a chuck plate adapted to bear against an end face of said roll, means operatively connected to and journaling said chuck body for rotation relative to said shaft, and gripping means on said chuck body adapted to engage said roll adjacent to the core and outer periphery thereof for attaching said roll to said chuck body for rotation therewith, said gripping means including arcuate material-penetrating elements, means pivotally mounting said material-penetrating elements for arcuate movement through said chuck plate radially outward of said core to penetrate said adjacent end of said roll, said arcuate movement including a motion component axially of said roll of material and a motion component radially and inwardly of said roll of material to thrust said material-penetrating element into the inner portion of said roll and to secure same to said chuck, further material-penetrating elements contiguous to said outer periphery of said roll, and arranged to penetrate the outer periphery of said roll, and means on said chuck body mounting said further material-penetrating elements on said chuck body for movement into gripping engagement with said roll.

References Cited in the file of this patent
UNITED STATES PATENTS 1,892,058    Judelshon   ------------ Dec. 27, 1932